US008271662B1

(12) United States Patent
Gossweiler, III et al.

(10) Patent No.: US 8,271,662 B1
(45) Date of Patent: Sep. 18, 2012

(54) SELECTIVE PAIRING OF DEVICES USING SHORT-RANGE WIRELESS COMMUNICATION

(75) Inventors: Richard Carl Gossweiler, III, Sunnyvale, CA (US); Colin Albright McDonough, St. Louis, MO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/251,015

(22) Filed: Sep. 30, 2011

Related U.S. Application Data

(63) Continuation of application No. 13/232,689, filed on Sep. 14, 2011.

(51) Int. Cl.
*G06F 15/16* (2006.01)

(52) U.S. Cl. ..................................... 709/227

(58) Field of Classification Search ........... 709/227–229
See application file for complete search history.

(56) References Cited

U.S. PATENT DOCUMENTS

| 7,748,035 | B2 | 6/2010 | Nedeltchev et al. |
| 7,805,134 | B2 | 9/2010 | Mirza-Baig |
| 7,809,012 | B2 | 10/2010 | Ruuska et al. |
| 2009/0101716 | A1 | 4/2009 | Mani et al. |
| 2009/0187759 | A1 | 7/2009 | Marsico |
| 2010/0045441 | A1 | 2/2010 | Hirsch et al. |
| 2010/0137024 | A1* | 6/2010 | Maguire .................... 455/552.1 |
| 2010/0178866 | A1 | 7/2010 | Jalkanen |
| 2010/0203831 | A1* | 8/2010 | Muth .......................... 455/41.2 |
| 2011/0070829 | A1 | 3/2011 | Griffin et al. |
| 2011/0210831 | A1* | 9/2011 | Talty et al. ................. 340/10.51 |
| 2011/0275316 | A1* | 11/2011 | Suumaki et al. ............. 455/41.1 |
| 2011/0287718 | A1* | 11/2011 | Abel et al. ................... 455/41.1 |
| 2011/0319016 | A1* | 12/2011 | Gormley et al. ............. 455/41.1 |

FOREIGN PATENT DOCUMENTS

WO     WO 2009/105115     * 8/2009

OTHER PUBLICATIONS

NFC Forum, "Generic Control Record Type Definition", Technical Specification, NFC Forum, GC-RTD 1.0, NFCForum-TS-Generic-ControlRTD_1.0, Mar. 7, 2008, 24 pp.
Technabob, "Nokia Play 360 NFC Portable Speaker: Bump to Play", http://technabob.com/blog/2011/06/22/nokia-play-360-nfc-portable-speaker/, Jun. 22, 2011, 9 pp.
"Frequently Asked Questions," Bump Technologies, Inc. 2011 [online]. Retrieved from the Internet: <http://bu.mp/faq> (4 pgs.).
"Get connected," Bump Technologies, Inc. 2011 [online]. Retrieved from the Internet: <http://bu.mp/> (1 pg.).
U.S. Appl. No. 13/232,689, by Richard Carl Gossweiler, III, filed Sep. 14, 2011.

(Continued)

*Primary Examiner* — Larry Donaghue
(74) *Attorney, Agent, or Firm* — Shumaker & Sieffert, P.A.

(57) ABSTRACT

In general, this disclosure describes techniques for receiving, by a first computing device, information from a second computing device communicated using short-range wireless communication functionality. Responsive to receiving the information, activating, by the first computing device, a secondary communication functionality that is different from the short-range wireless communication functionality. A communication session may be established between the first computing device and the second computing device using the secondary communication functionality.

21 Claims, 5 Drawing Sheets

OTHER PUBLICATIONS

"Wi-Fi Protected Setup" Wikipedia [online]. First accessed on Feb. 14, 2011. Retrieved from the Internet: <http://en.wikipedia.org/wiki/Wi-Fi_Protected_Setup> (3 pgs.)

"Near Field Communication," ECMA Internationai [online]. First accessed on Feb. 14, 2011. Retrieved from the Internet: <http://www.ecma-international.org/activities/Communications/tc32-tg19-2005-012.pdf> (12 pgs.)

"NFC Near Field Communication," Radio-Electronics.com [online]. First accessed on Feb. 14, 2011. Retrieved from the Internet: <http://www.radio-electronics.com/info/wireless/nfc/near-field-communications-tutorial.php> (4 pgs.).

"Frequently Asked Questions: Wi-Fi Protected Setup," Wi-Fi Alliance, 2006 [online]. First accessed on Feb. 14, 2011. Retrieved from the Internet: <http://www.wi-fi.org/files/WFA%20Wi-Fi%20Protected%20Setup%20FAQ.pdf> (4 pgs.).

"Near Field Communication," Wikipedia [online]. First accessed on Feb. 14, 2011. Retrieved from the Internet: <http://en.wikipedia.org/wiki/Near_field_communication> (20 pgs.)

U. S. Appl. No. 13/232,644, by Andrew Hsieh, filed Sep. 14, 2011.

U.S. Appl. No. 13/250,695, by Hsieh et al., filed Sep. 30, 2011.

Dodson, "NFC and Bluetooth brought together with Android 2.3.3," MobiSocial News [online]. Feb. 10, 2011. Retrieved from the Internte: <http://mobisocial.stanford.edu/news/2011/02/nfc-and-bluetooth-brought-together-with-android-2-3-3/> (9 pgs.).

Epstein, "New Android API eliminates Bluetooth pairing using NFC," BGR Media. LLC [online]. Feb. 19, 2011. Retrieved from the Internet: <http://www.bgr.com/2011/02/19/new-android-api-eliminates-bluetooth-pairing-using-nfc./> (9 pgs.).

* cited by examiner

SELECTIVE PAIRING OF DEVICES USING SHORT-RANGE WIRELESS COMMUNICATION

This application is a continuation of U.S. application Ser. No. 13/232,689 filed Sep. 14, 2011, which is assigned to the assignee hereof and is hereby expressly incorporated by reference herein.

TECHNICAL FIELD

The disclosure relates to pairing of and communication between computing devices.

BACKGROUND

Separate computing devices or electronic devices may need to be paired in order to communicate with each other. Usually, in order to pair two devices, a user is required to enter identification codes for each device.

SUMMARY

One example provides a method that includes receiving, by a first computing device, information from a second computing device communicated using a short-range wireless communication functionality. Responsive to receiving the information, the method further includes activating, by the first computing device, a secondary communication functionality that is different from the short-range wireless communication functionality. The method also includes establishing a communication session between the first computing device and the second computing device using the secondary communication functionality.

In one example, a computer-readable storage medium comprising instructions for causing a processor to perform operations is also provided. The instructions include receiving, by a first computing device, information from a second computing device communicated using short-range wireless communication functionality. Responsive to receiving the information, the instructions further include activating, by the first computing device, a secondary communication functionality. The instructions also include establishing a communication session between the first computing device and the second computing device using the secondary communication functionality.

Another example includes a computing device comprising one or more processors. The computing device also includes a short-range wireless communication device configured to transmit and receive information via a short-range wireless communication protocol. The computing device also comprises a secondary communication device configured to transmit and receive information via a secondary communication protocol, wherein the secondary communication protocol is different from the short-range wireless communication protocol. The first computing device further comprises a memory storing instructions. When the instructions are executed by the one or more processors, they cause the computing device to perform a method for communicating with another device, the method comprising receiving, using the short-range wireless communication device, a request to establish a communication session with the other device, wherein the request is transmitted using the short-range wireless communication protocol. The instructions further cause the computing device to activate the secondary communication device in response to the request and establishing a communication session with the other device using secondary communication device, wherein the communication session utilizes the secondary communication protocol.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present application. Like reference characters denote like elements throughout the figures and text.

DETAILED DESCRIPTION

Separate devices, such as a mobile phone and a Bluetooth-enabled headset, may need to be paired in order to communicate with each other. At least one of the devices, referred to as a first device, may include a short-range wireless communication device that may be used to detect the presence of the other, second device, which may also include a short-range wireless communication device. The devices may be paired using the short-range wireless communication devices using a short-range communication protocol. At least the first device may activate a secondary communication functionality upon detecting or pairing with the second device using the short-range wireless communication device. The secondary communication functionality may use a secondary communication protocol that differs from the short-range communication protocol. A communication session between the two devices may be established using the secondary communication functionality, which may use, for example, Bluetooth or Wi-Fi. The secondary communication session may have larger bandwidth or range than the short-range wireless communication.

Power consumption may be reduced on at least the first device by maintaining the secondary communication functionality of the first device in an inactive state until the second device is detected using the short-range wireless communication device. For example, devices or applications associated with the secondary communication functionality may be powered off until a pairing has been established between the devices using a short-range wireless network, such as near field communication (NFC). For example, a user may desire to pair a smart phone having NFC capabilities with a Bluetooth-enabled headset also having NFC capabilities. The user places the smart phone and headset within NFC range of each other, which may include tapping or bumping the devices against each other. Within NFC range, information is exchanged between the smart phone and the headset using NFC. This information may be used to pair the devices. Once the smart phone detects the headset using NFC, the smart phone activates its Bluetooth functionality. Likewise, the headset may activate its Bluetooth functionality as well if its Bluetooth functionality was previously inactive. The smart phone and the headset establish communications over Bluetooth. The techniques of this disclosure may also simplify pairing by not requiring user data entry to establish the secondary communications.

Figure 1:
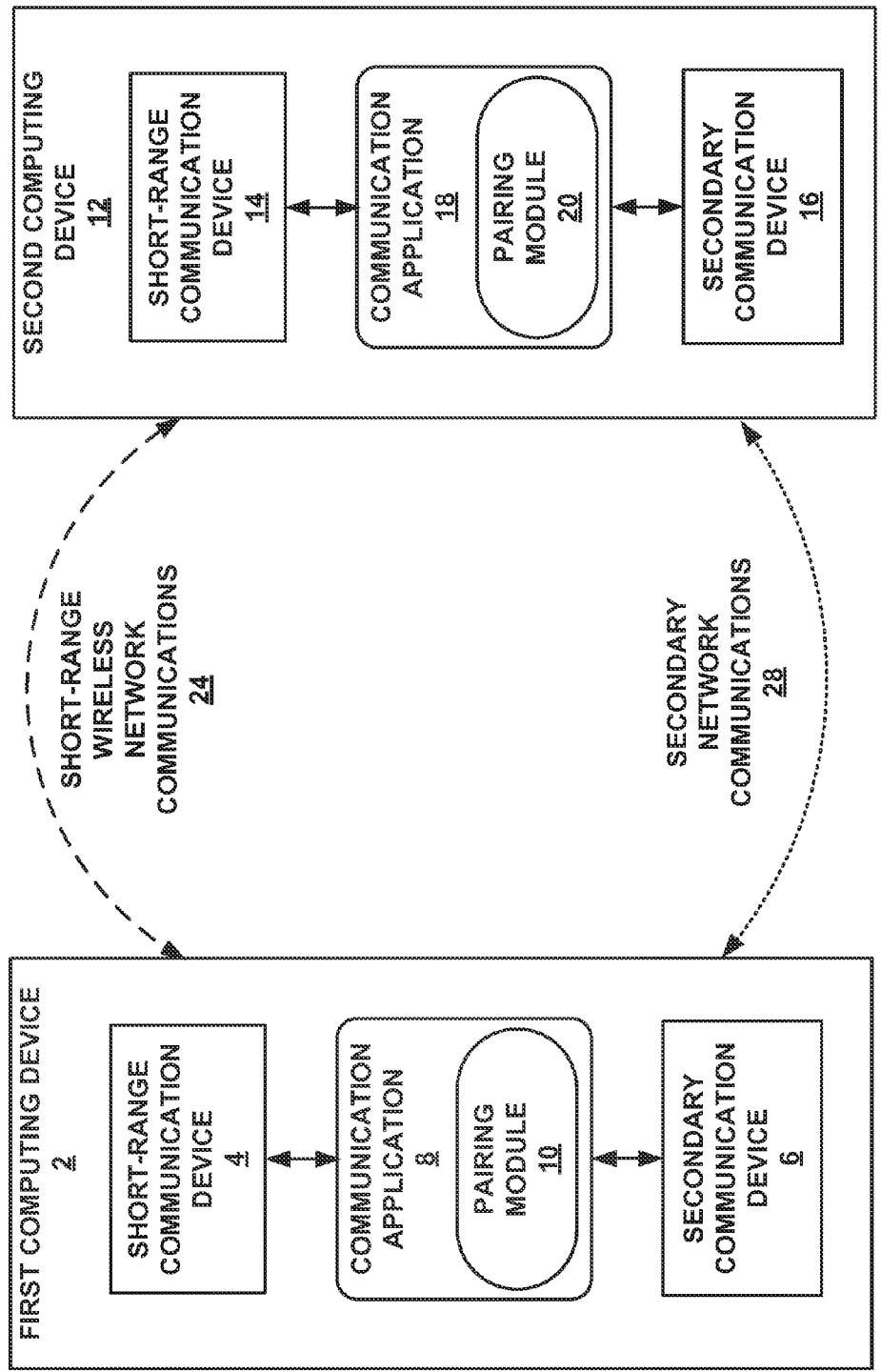
FIG. 1 is a block diagram illustrating an example of a first computing device that communicates with a second computing device using one or more short-range wireless network communications in order to establish a secondary communication session, in accordance with one or more aspects of the present disclosure.

FIG. 1 is a block diagram illustrating an example of a first computing device 2 that communicates with a second computing device 12 using a short-range wireless network communications 24 in order to establish a secondary communication session, in accordance with one or more aspects of the present disclosure. First computing device 2 and second computing device 12 may be devices that may be paired together to exchange data. FIG. 1 shows one example of two devices communicating over short-range wireless network communications 24 and then establishing a secondary communication session. It is to be understood that other examples are contemplated herein.

Communications between first computing device 2 and second computing device 12 may be established using short-range wireless network communications 24 before establishing a secondary communication session over a secondary network communications 28. This may increase the likelihood that the secondary communication session is desired. Secondary network communications 28 may include a wide-area network such as the Internet, a local-area network (LAN), a personal-area network (PAN) (for example, Bluetooth), an enterprise network, a wireless network, a cellular network, a telephony network, a Metropolitan area network (for example, Wi-Fi, WAN, or WiMAX), one or more other types of networks, or a combination of two or more different types of networks (for example, a combination of a cellular network and the Internet).

First computing device 2 may, in some examples, include, be, or be part of a portable computing device (for example, a mobile phone, netbook, laptop, personal data assistant (PDA), tablet device, portable gaming device, portable media player, e-book reader, watch, etc.) as well as non-portable devices (for example, a desktop computer). First computing device 2 may, in some examples, include, be, or be part of an input/output device (for example, a headset, speakers, video display device), a peripheral device (for example, a printer, scanner, etc.), a vehicle (for example, a passenger car), or any other device capable of pairing and communicating with another computing device. Likewise, second computing device 12 may be any of the devices listed above. First computing device 2 and second computing device 12 may be similar or dissimilar devices.

For purposes of illustration only, in this disclosure, first computing device 2 is described as a portable or mobile device, but aspects of this disclosure should not be considered limited to such devices. First computing device 2 may also be referred to herein generally as a "computing device." Second computing device 12 may be any type of computing device, but, for purposes of illustration only, may be a device that pairs with first computing device 2 to increase the functionalities or capabilities of first computing device 2. Examples of such a second computing device 12 include a wireless headset and a wireless radio that may be installed in a vehicle. Second computing device 12 may also be referred to herein as a "device."

First computing device 2 may comprise a short-range communication device 4. Short-range communication device 4 may provide short-range communication functionality to first computing device 2 and enable connection to short-range wireless network communications 24. Short-range communication device 4 may be capable of communicating using a short-range wireless communication technology, such as Near Field Communication (NFC). Short-range wireless network communications 24, in some examples, may include wireless communications between first computing device 2 and second computing device 12 of approximately 10 meters or less. First computing device 2 may also execute a short-range wireless application that receives data from short-range communication device 4.

First computing device 2 may also comprise a secondary communication device 6. Secondary communication device 6 may provide communication functionality to first computing device 2 in addition to the functionality provided by short-range communication device 4. Secondary communication device 6 may provide communication functionality having a greater bandwidth and/or longer range than short-range communication device 4. Secondary communication device 6 may establish a secondary network communications 28 with second computing device 12. Secondary network communications 28 may be a personal area network (PAN). Secondary communication device 6 may provide Bluetooth, Wi-Fi, second-generation wireless telephone technology (2G), third-generation mobile telecommunications (3G), fourth-generation wireless telephone technology (4G), or Long Term Evolution (LTE) functionality, or other network functionalities. In other examples, secondary communication device 6 may support other communication devices, standards, or protocols.

Second computing device 12 may also comprise a short-range communication device 14 and a secondary communication device 16. Short-range communication device 14 may be similar to short-range communication device 4 of first computing device 2. Similarly, secondary communication device 16 may be similar to secondary communication device 6 of first computing device 2. In some examples, short-range communication device 14 may be a NFC or radio frequency identification (RFID) tag attached to second computing device 12.

Short-range communication devices 4 and 14 may provide first and second computing devices 2 and 12 with passive or active short-range communication capabilities, respectively. Short-range wireless network communications 24, in some examples, may include two different modes of operation. For example, short-range wireless network communications 24 may include an active mode and a passive mode of operation. In an active mode of operation, for example, first computing device 2 may generate a first radio field that is received by second computing device 12 when second computing device 12 is within physical proximity to first computing device 2. In response, second computing device 12 may generate a second radio field that is received by short-range communication device 4. In this way, data may be communicated between first computing device 2 and second computing device 12 over short-range wireless network communications 24.

In a passive mode of operation, load modulation techniques may be employed to facilitate data communication between first computing device 2 and second computing device 12. For example, in a passive mode, second computing device 12 does not generate a radio field in response to the radio field of short range communication device 4. Instead, second computing device 12 may include electrical hardware that generates a change in impedance in response to a radio field. For example, short-range communication device 4 may generate a radio field that is received by second computing device 12. Electrical hardware in second computing device 12 may generate a change in impedance in response to the radio field. The change in impedance may be detected by short-range communication device 4. In this way, load modulation techniques may be used by first computing device 2 to receive information from second computing device 12. Other well-known modulation techniques, including phase modulation or amplitude modulation, may also be employed to facilitate data communication between first computing device 2 and second computing device 12.

For example, computing device 2 may use the short-range wireless communication technology of short-range communication device 4 to detect tags that are attached to other peripheral devices such as a car dock, desk dock, a wireless charger, or other peripherals or devices. Each tag may contain unique information corresponding to the environment in which it is placed or the type of device onto which it is placed. When computing device 2 detects a particular tag, computing device 2 may receive, for example, information from the tag. The information may be, for example, a serial number and data payload or network configuration information from the tag. In some examples, computing device 2 may provide the information, including the data payload, to applications executing on computing device 2. The information may include an identifier of the device 12 to which the tag is attached. The information may also include session information for establishing a secondary communication session between computing device 2 and device 12.

First computing device 2 may further comprise a communication application 8 that may be executed by a processor of first computing device 2. Communication application 8 may contain instructions for causing a processor to perform the instructions and may be stored on a computer-readable storage medium. First computing device 2 may have other components or devices, such as a processor and a computer-readable storage medium, as described below with respect to FIG. 2.

Communication application 8 may provide first computing device 2 with instructions for establishing a communication session between first computing device 2 and second computing device 12 using secondary communication device 6. When short-range communication device 4 of first computing device 2 detects second computing device 12, communication application 8 may activate secondary communication device 6. Secondary communication device 6 may be in an inactive state, such as a low power state or a powered off state, until the presence of another device that can join second communication network 28 is detected. The presence of another device may be detected using short-range wireless network communications 24.

Upon detecting second computing device 12 over short-range wireless network communications 24, communication application 8 may make a determination of whether second computing device 12 supports secondary network communications 28. Information exchanged between first computing device 2 and second computing device 12 may indicate whether the devices can connect to secondary network communications 28. Such information can include, for example, network configuration information.

If second computing device 12 can connect to secondary network communications 28, communication application 8 may signal secondary communication device 6 to change into an active state, such as a power on state. If second computing device 12 cannot join secondary network communications 28, communication application 8 may not signal secondary communication device 6 to power on. In such a case, secondary communication device 6 remains in an inactive state, saving power for first computing device 2.

Communication application 8 may also comprise a pairing module 10. Pairing module 10 may perform at least two functions. For example, pairing module 10 may establish a pairing between first computing device 2 and second computing device 12 for communications over secondary network communications 28. A pairing occurs when two devices agree to communication with each other and establish a connection. An encryption key, password, or passkey may be utilized to create and establish a pairing between the devices. A pairing may be initiated over short-range wireless network communications 24. Pairing module 10 may establish a pairing between first computing device 2 and second computing device 12 based on information exchanged over short-range wireless network communications 24. In some examples, first computing device 2 and second computing device 12 may connect over secondary network communications 28 to establish a pairing. Once a pairing is established, first computing device 2 and second computing device 12 may continue to exchange information over secondary network communications 28.

Figure 2:
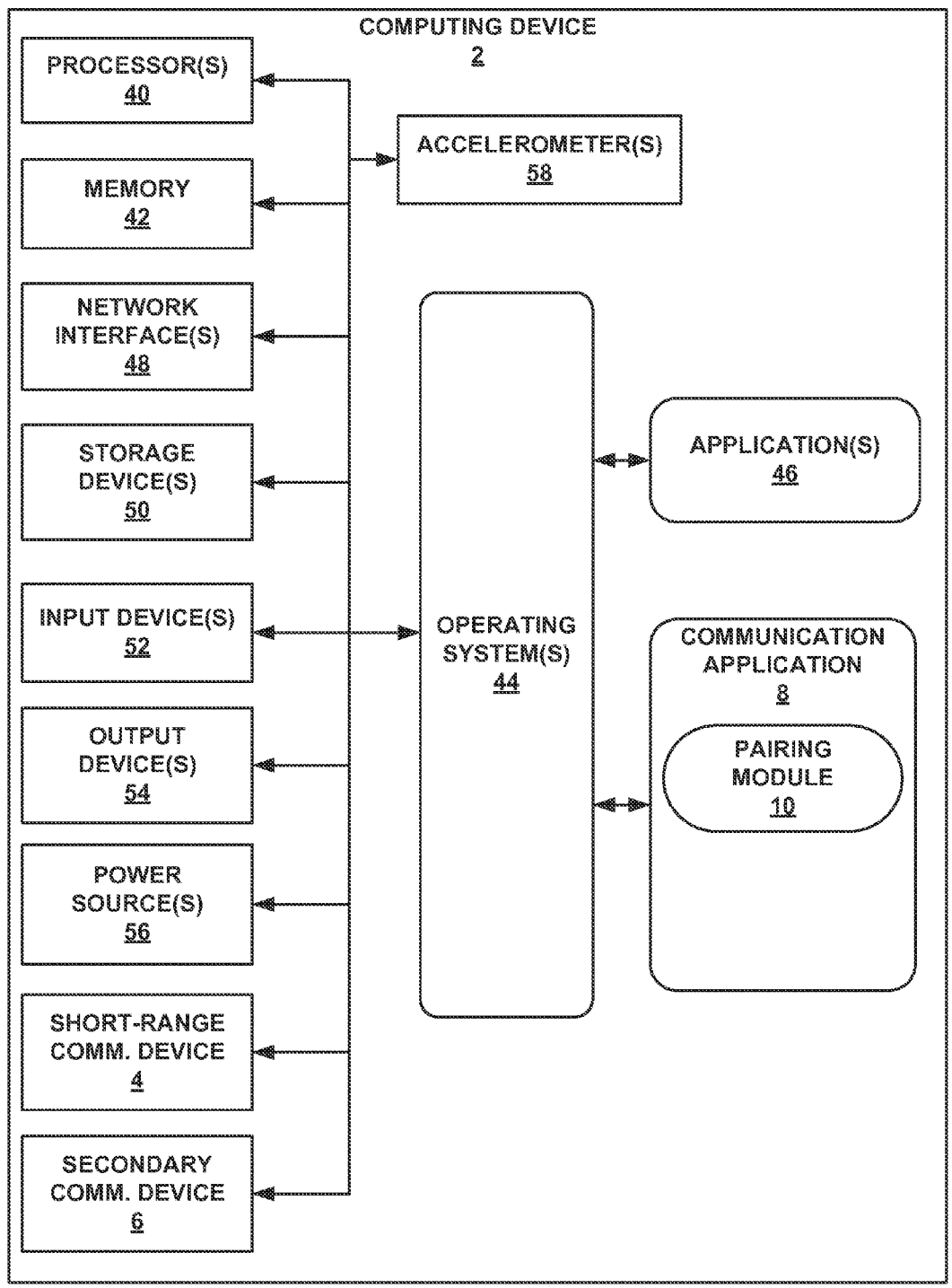
FIG. 2 is a block diagram illustrating further details of one example of the first computing device shown in FIG. 1, in accordance with one or more aspects of the present disclosure.

A memory or storage medium of first computing device 2, such as memory 42 or storage device 50 shown in FIG. 2, may include or store information related to an established pairing between first computing device 2 and second computing device 12. An established pairing may be referred to as a previous pairing. Information related to an established pairing may include identification codes for the computing devices 2 and 12. Established pairings between first computing device 2 and another device may also be stored and used to re-connect first computing device 2 and the other device.

Once first computing device 2 and second computing device 12 have been paired for a first time, pairing module 10 again may pair first computing device 2 and second computing device 12 using the previous pairing information. When short-range communication device 4 of first computing device 2 comes into range of short-range communication device 14 of second computing device 12 again, pairing module 10 may query whether the devices have been previously paired. If so, pairing module 10 may use the previous pairing information to re-establish a connection between first computing device 2 and second computing device 12 using secondary communication device 6. For example, pairing device 10 may retrieve the information of the previous pairing from the memory or storage medium in order to re-establish a connection over secondary network communications 28. In this manner, a pairing between first computing device 2 and second computing device 12 may not be re-initialized a second time. Rather, upon coming into range of each other's short-range wireless devices, a determination may be made on whether first computing device 2 and second computing device 12 should communicate. That determination may be assumed, for example, by first computing device 2 detecting second computing device 12 over short-range wireless network communications 24.

As shown in FIG. 1, second computing device 12 may also comprise communication application 18 and pairing module 20. Communication application 18 may have similar functionality as that of communication application 8. Likewise, pairing module 20 may have similar functionality as that of communication application 10. In some examples, communication application 18 or pairing module 20 may have different functionality than communication application 8 or pairing module 10. In other examples, second computing device 12 may not include communication application 18 or pairing module 20.

Computing device 2 may be connected to second computing device 12 in a peer-to-peer fashion through short-range wireless network communications 24 or secondary network communications 28. A peer-to-peer connection may be a network connection that partitions tasks or workloads between peers (for example, first computing device 2 and second computing device 12) without centralized coordination by a server. Computing device 2 and second computing device 12 may exchange communication data via a peer-to-peer connection. Further, there may be no intermediary device between first computing device 2 and second computing device 12. For example, first computing device 2 and second computing device 12 may be directly connected without a server or other system in between.

FIG. 2 is a block diagram illustrating further details of one example of the first computing device 2 shown in FIG. 1, in accordance with one or more aspects of the present disclosure. FIG. 2 illustrates only one particular example of computing device 2, and many other example embodiments of computing device 2 may be used in other instances. Additionally, one or more computing devices, such as second computing device 12 of FIG. 1, may be similar to computing device 2 as shown in FIG. 2.

As shown in the specific example of FIG. 2, computing device 2 includes one or more processors 40, memory 42, a short-range communication device 4, a secondary communication device 6, one or more network interfaces 48, one or more storage devices 50, one or more input devices 52, one or more output devices 54, one or more power sources 56, and one or more accelerometers 58. Computing device 2 also includes one or more operating systems 44. Computing device 2 may further include one or more applications 46 and communication application 8. Communication application 8 may include pairing module 10, which may be executable by computing device 2. In other examples, one or more operating systems 44 may include communication application 8 or pairing module 10, which may be executable by computing device 2. Operating system 44, applications 46, and communication application 8 may also be executable by computing device 2. Each of components 40, 42, 44, 46, 48, 50, 52, 54, 56, 58, 4, 6, 8, and 10 may be interconnected (physically, communicatively, and/or operatively) for inter-component communications.

One or more processors 40 may be configured to implement functionality or process instructions for execution in computing device 2. Processors 40 may be capable of processing instructions stored in memory 42 or instructions stored on storage devices 50.

Memory 42 may be configured to store information within computing device 2 during operation. Memory 42 may, in some examples, be described as a non-transitory or tangible computer-readable storage medium. In some examples, memory 42 is a temporary memory, meaning that a primary purpose of memory 42 is not long-term storage. Memory 42 may also, in some examples, be described as a volatile memory, meaning that memory 42 does not maintain stored contents when computing device 2 is turned off. Examples of volatile memories include random access memories (RAM), dynamic random access memories (DRAM), static random access memories (SRAM), and other forms of volatile memories known in the art. In some examples, memory 42 may be used to store program instructions for execution by one or more processors 40. Memory 42 may be used by software or applications running on computing device 2 (for example, one or more of applications 46) to temporarily store information during program execution.

Storage devices 50 may also include one or more non-transitory or tangible computer-readable storage media. Storage devices 50 may be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 may also include one or more input devices 52. Input devices 52 may be configured to receive input, for example, from a user, through tactile, audio, or video input. Examples of input devices 52 may include a touch-sensitive display, a mouse, a keyboard, a voice responsive system, a microphone, a camera, or any other type of device for detecting a command or input from a user. In some examples, one or more input devices 52 may also be an output device 54.

One or more output devices 54 may also be included in computing device 2, for example, a speaker. Output devices 54 may be configured to provide output to a user using tactile, audio, or video output. Output devices 54 may utilize a sound card, a video graphics adapter card, or any other type of device for converting a signal into an appropriate form understandable to humans or machines. Additional examples of output devices 54 may include a cathode ray tube (CRT) monitor, a liquid crystal display (LCD), or any other type of device that can provide output to user 14. An output device 54 may also be a touch-sensitive or presence-sensitive screen. In one example, one or more output devices 54 may also be an input device 52.

Computing device 2 may include one or more power sources 56, which may be rechargeable and provide power to computing device 2. The one or more power sources 56 may be one or more batteries. The one or more batteries may be made from nickel-cadmium, lithium-ion, or any other suitable material. In another example, the one or more power sources 56 may include a power supply connection that receives power from a power source external to computing device 2. The one or more power sources 56 may provide more power to secondary communication device 6 when it is in an active state than when it is in an inactive state.

Computing device 2 may include one or more short-range communication devices 4. In some examples, short-range communication device 4 communicates wirelessly with other devices in physical proximity to short-range communication device 4, for example, approximately 0-100 meters. In other examples, short-range communication device 4 reads a tag, for example, an RFID tag or an NFC tag, via a radio frequency signal. Some examples of short-range communication device 4 include a Near-Field Communication radio.

Computing device 2 may include one or more secondary communication devices 6. Secondary communication device 6 may have a longer range than short-range communication device 4. Secondary communication device 6 may be a wireless communication device. Examples of such secondary communication devices 6 may include Bluetooth®, 2G, 3G, Ultra-Wideband, and Wi-Fi® radios, among other examples. Secondary communication device 6 may support a personal area network (PAN).

Computing device 2 may maintain secondary communication device 6 in a low power state or an off state while computing device 2 is not communicating with another device. When computing device 2 detects another device that can communicate using the secondary communications, for example, through short-range communication device 4, communication application 8 may signal secondary communication device 6 to enter an active state. An active state may be, for example, a high power or a powered-on state.

Computing device 2 also includes one or more network interfaces 48 as, or in addition to, short-range communication device 4 and secondary communication device 6. Computing device 2 may utilize one or more network interfaces 48 to communicate with external devices via one or more networks (for example, short-range wireless network communications 24 or secondary network communications 28 shown in FIG. 1). In one example, one or more network interfaces 48 may correspond to a wired or wireless interface for receiving data from computing devices (for example, second computing device 12 of FIG. 1). In some examples, computing device 2 may include a plurality of either or both input and output interfaces. In some examples, network interfaces 48 may include separate input and output network interfaces. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 2 may utilize network interface 48 to wirelessly communicate with an external device, such as second computing device 12, a server, or other networked computing device.

Computing device 2 may include one or more operating systems 44. One or more operating systems 44 may control the operation of components of computing device 2. For example, operating systems 44 may facilitate the interaction of application 46 or communication application 8 with processors 40, memory 42, network interfaces 48, storage devices 50, input devices 52, output devices 54, one or more power sources 56, short-range communication device 4, and secondary communication device 6. In other examples, communication application 8 may be managed at least partially by one or more operating systems 44.

Communication application 8 may include pairing module 10, which may be executed as part of one or more operating systems 44. Pairing module 10 may process information from another device, such as second computing device 12, relating to pairing computing device 2 with the other device. Such information may be received using short-range communication device 4, secondary communication device 6, or another network interface 48. The information may include a unique identifier of the device and network configuration or session information. Pairing module 10 may also determine whether computing device 2 and the device have been previously paired before. If so, information from the previously established pairing may be used to reconnect the devices using secondary communication device 6, for example, over secondary network communications 28.

Communication application 8 or pairing module 10 may provide a signal to activate secondary communication device 6 based upon detection of another device via short-range communication device 4. Additionally, communication application 8 may receive input from a component such as processors 40, memory 42, one or more network interfaces 48, one or more storage devices 50, one or more output devices 54, one or more power sources 56, or one or more operating systems 44. In other cases, communication application 8 may transmit input or signals to an application, for example applications 46, or other component in computing device 2.

Any applications, for example applications 46 or communication application 8, implemented within or executed by computing device 2 may be implemented or contained within, operable by, executed by, or be operatively or communicatively coupled to components of computing device 2, for example, one or more processors 40, memory 42, short-range communication device 4, secondary communication device 6, one or more network interfaces 48, or storage devices 50.

Figure 3:
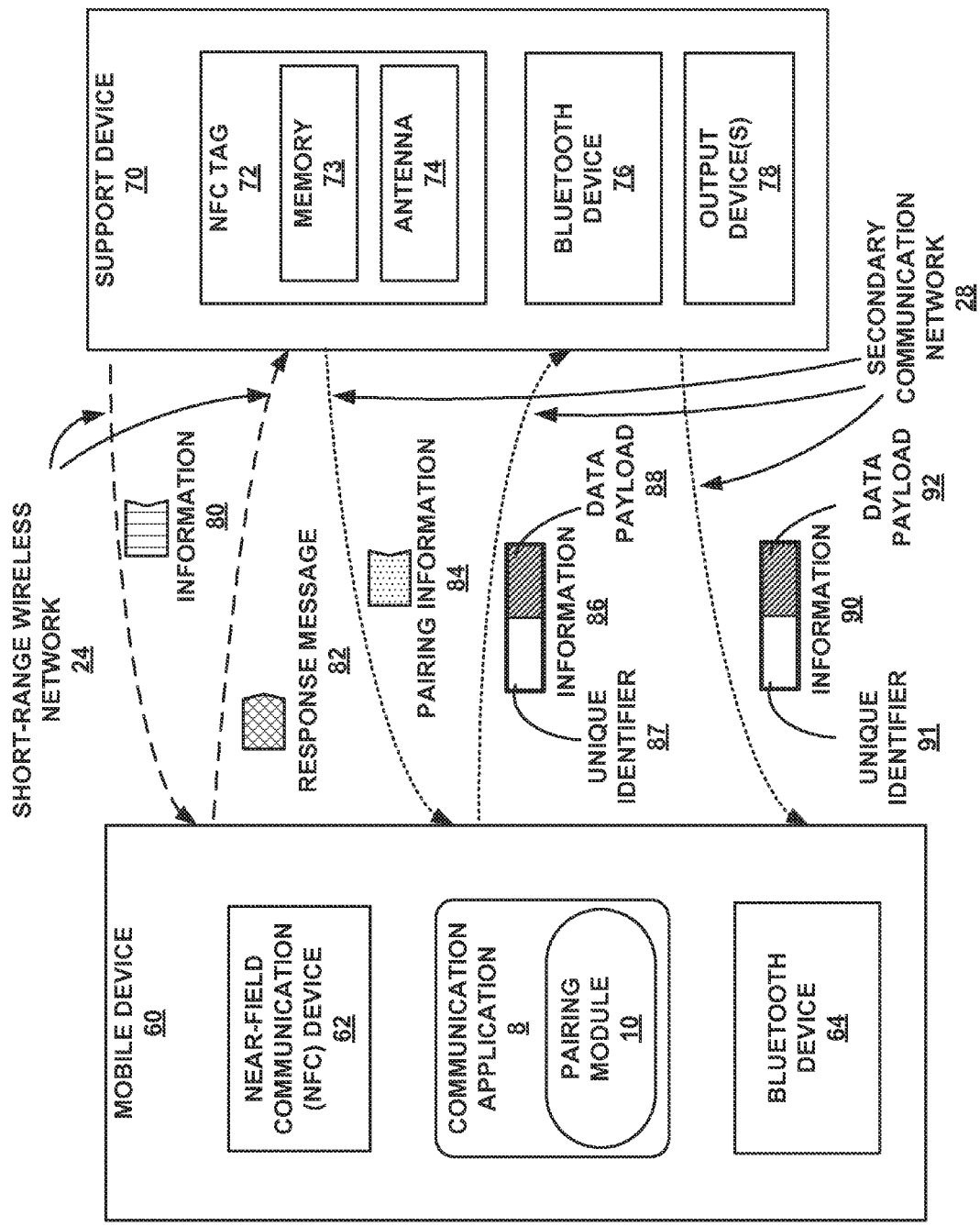
FIG. 3 is a block diagram illustrating an example of a mobile device that communicates with a support device using near-field communication (NFC) functionality in order to establish a communication session, in accordance with one or more aspects of the present disclosure.

FIG. 3 is a block diagram illustrating an example of a mobile device 2 that communicates with a support device 70 using near-field communication (NFC) functionality in order to establish a communication session, in accordance with one or more aspects of the present disclosure. Although the systems and techniques described herein support many types of pairing and communicating capabilities, for illustrative purposes only, FIG. 3 will be described in terms of a device including a mobile device and a radio that is Bluetooth-enabled. However, it is to be understood that the techniques and examples described in accordance with this disclosure apply to any computing devices that may pair and communicate over a short-range wireless network and a secondary wireless network. FIG. 3 illustrates only one particular example of mobile device 60 and support device 70, and many other example devices may be used in other instances. For example, mobile device 60 may be or be similar to first computing device 2 as shown in FIGS. 1 and 2. Additionally, support device 70 may be similar to second computing device 12 of FIG. 1 or to first computing device 2 of FIGS. 1 and 2.

Mobile device 60 may be a cell phone, such as a smart phone, for example. Mobile device 60 may include, among other components or devices, a near-field communication (NFC) device 62 and a Bluetooth device 64. NFC device 62 may be an example of a short-range communication device, such as short-range communication device 4 of FIG. 1. Bluetooth device 64 may be an example of a secondary communication device, such as secondary communication device 6 of FIG. 1. NFC device 62 may include an NFFC antenna and an NFC control module. Bluetooth device 64 may include a Bluetooth server and client. Mobile device 60 may also be configured to execute a communication application 8 and a pairing module 10. Mobile device 60 may be similar to computing device 2 as shown in FIGS. 1 and 2.

Support device 70 may include, among other components or devices, an NFC tag 72, a Bluetooth device 78, and one or more output devices 78. NFC tag 72 may be a short-range communication device, such as short-range communication device 14 of FIG. 1. NFC tag 72 may be a passive device that includes a memory 72 and an antenna 73. Memory 72 may store identification information for support device 70. Bluetooth device 78 may be a communication device that supports Bluetooth communications. Bluetooth device 78 may be similar to a secondary communication device, such as secondary communication device 16 of FIG. 1. Bluetooth device 78 may include a Bluetooth server and client. In other examples, support device 70 does not contain Bluetooth device 78 but couples to a secondary communication device of another device, such as a Bluetooth device of a vehicle. An output device 78 may be, for example, a speaker.

FIG. 3 depicts an example exchange of messages between mobile device 60 and support device 70. A support device may be any device that provides additional or alternative functionality to mobile device 60. For purposes of illustration, FIG. 3 is discussed in terms of an example where mobile device 60 is a mobile phone and support device 70 is a Bluetooth-enabled radio that may be coupled to speakers in a vehicle. In this example, support device 70 may be communicatively coupled to the vehicle's internal computational system which may include a Bluetooth protocol device. However, other examples with other devices are possible.

For example, mobile device 2 and support device 70 may initially not be in communication with each other. Bluetooth device 64 may be in an off, low-power, or inactive state. In some examples, Bluetooth device 74 may also be in an off, low-power, or inactive state. Bluetooth devices 64 and/or 74 may be powered on, in a high-power, or active state once a determination is made that mobile device 60 and support device 70 wish to communicate using Bluetooth. Keeping Bluetooth devices 64 and/or 74 off until a pairing is established or detected may save battery power of one or both of mobile device 2 and support device 70, respectively. For example, activating NFC tag 72 of support device 70 due to the proximity of NFC device 62 of mobile device 60 may trigger powering on of Bluetooth device 76. In another example, support device 70 may be in an off, low-power, or inactive state until NFC tag 72 is charged by another NFC device, such as NFC device 62.

By using NFC device 62 and NFC tag 72, which have relatively short ranges, inadvertent pairings of mobile device 60 and support device 70 may be decreased. For example, with devices having longer range communication devices, such as Wi-Fi, sometimes pairings between the two devices may be automatically made when the user does not want the devices to dock or pair. For example, a user with a mobile phone located outside a vehicle may be paired with a Bluetooth radio inside the vehicle before the user enters the vehicle, because the Bluetooth range may extend outside the vehicle. If the mobile device receives a call while the user remains outside the vehicle, for example, the call may be routed to the vehicle's speakers. Thus, devices that pair directly using longer-range communication devices may pair when a user does not want them to pair. In contrast, techniques of the present disclosure may decrease the likelihood of two devices pairing before a user wants them to pair. For example, decreasing the range over which pairings may be initiated may decrease the likelihood of inadvertent pairings. Further, requiring an action to pair the devices, such as placing the NFC devices in proximity of each other, may increase the likelihood that a pairing between the devices is desired.

Support device 70 may come within range of NFC device 62 of mobile device 60. For example, a user carrying mobile device 60, for example, a cell phone, enters their vehicle which contains support device 70, for example, a Bluetooth-enabled radio. The user may place mobile device 60 next to support device 70 or tap mobile device 60 against support device 70 in order to place mobile device 60 within NFC range of support device 70. The energy from an NFC antenna of NFC device 62 may charge the NFC tag 72 of support device 70 when they are close enough. Once charged, antenna 74 of NFC tag 72 may broadcast information 80 using over short-range wireless network communications 24. Information 80 may include a unique number identifying support device 70. Information 80 may also indicate that support device 70 supports a secondary communication network, such as a Bluetooth network. In other examples, information 80 may include a pairing number for pairing with support device 70. In yet other examples, information 80 may be a request to establish a communication session with support device 70.

NFC device 62 of mobile device 60 may detect information 80. Thus, mobile device 60 may determine it is proximate to a device that supports a secondary network communications 28. In response to receiving information 80, NFC device 62 may broadcast response message 82 over short-range wireless network communications 24. Response message 82 may include an acknowledgement, a pairing number, an identifier of mobile device 60, or the like. These short-range wireless communications may establish a number or code that may be used back and forth between mobile device 60 and support device 70. The number may be a pairing number for the devices to use for secondary network communications 28. At this stage, mobile device 60 and support device 70 may be pairing over an NFC network or determining that the devices want to pair over secondary network communications 28.

Upon receiving information 80, communication application 8 may signal Bluetooth device 64 to enter an active state. For example, Bluetooth device 64 may be powered on upon receipt of information 80. In another example, Bluetooth device 64 may be instructed to enter an active state when mobile device 60 and support device 70 agree to pair using Bluetooth device 64 and Bluetooth device 78, respectively.

In some examples, an initial pairing between mobile device 60 and support device 70 is established using short-range wireless network communications 24. Once these devices are initially paired, communicate over secondary network communications 28, and have ended a secondary network communications 28 session, the devices may use the previous pairing to re-establish communications when they come into proximity again. That is, bringing NFC device 62 of mobile device 60 into proximity of NFC tag 72 of support device 70 may indicate the devices are to re-establish communications over secondary network communications 28.

In order to establish a pairing over secondary network communications 28, pairing information 84 may be sent from support device 70 and received by mobile device 60. Pairing information 84 may include numbers, identifiers, or codes used to establish communications between mobile device 60 and support device 70. In some examples, mobile device 60 sends additional pairing information to support device 70. In some examples, once a pairing between mobile device 60 and support device 70 has been initially established with pairing information 84, pairing information 84 may not need to be sent again.

A secondary communication session may be established over a secondary network communications 28. Secondary network communications 28 may have a larger bandwidth and longer range than short-range wireless communications 24. Once communications are established between mobile device 60 and support device 70 over secondary network communications 28, such as a Bluetooth network, information and messages may be exchanged between the devices. For example, Bluetooth device 64 of mobile device 60 may send information 86 to support device 70. Information 86 may contain a unique identifier 87 in a header portion of information 86 that precedes a data payload 88. Unique identifier 87 may identify mobile device 60. Data payload 88 may, for example, contain data from mobile device 60, such as an audio signal received via an antenna of mobile device 60 during a phone call. Similarly, Bluetooth device 76 may send information 90 including a unique identifier 91 identifying support device 70 and a data payload 92.

Figure 4:
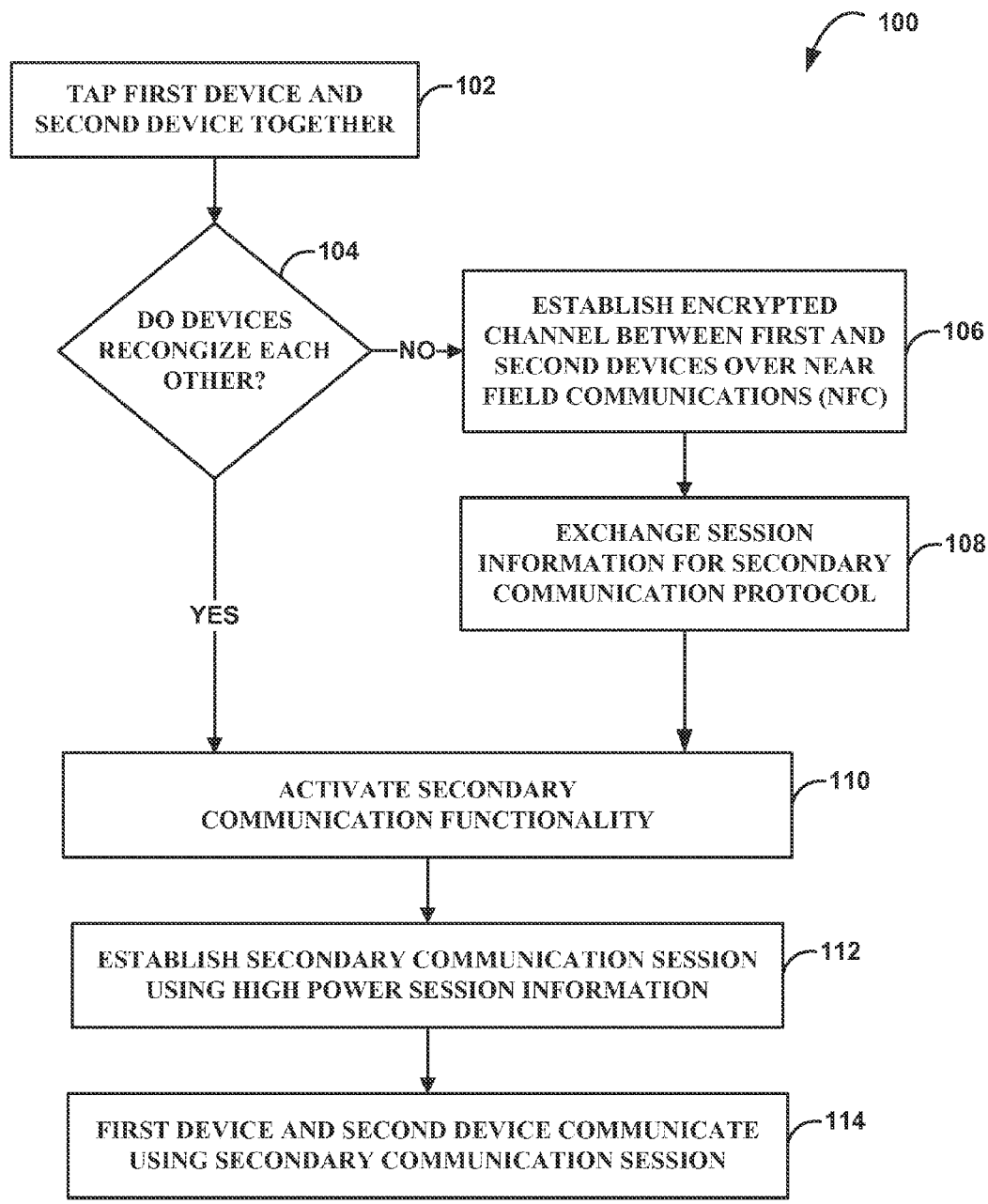
FIG. 4 is a flow chart illustrating an example method of pairing two devices and establishing a secondary communication session between the two devices, in accordance with one or more aspects of the present disclosure.

FIG. 4 is a flow chart illustrating an example method 100 of pairing two devices and establishing a secondary communication session between them, in accordance with one or more aspects of the present disclosure. FIG. 4 illustrates only one particular example of method 100, which may be performed using computing device 2 of FIGS. 1 and 2, computing device 12 of FIG. 1, mobile device 60 of FIG. 3 or support device 70 of FIG. 3. In other examples, other computing devices may be used.

A first device and a second device, each having short-range wireless communications, for example, NFC capabilities, may be tapped together (102). Tapping the devices may include lightly touching the devices together. In other examples, the devices may not actually touch, but are within range of their short-range wireless communication devices. Over this proximity, information may be exchanged between the devices. Method 100 determines whether the devices recognize each other (104).

If the devices recognize each other, at least one of the devices activates a secondary communication functionality, such as secondary communication device 4 of FIG. 1 (110). When the devices recognize each other, information from a previous pairing that may have been stored in memory, such as memory 42 of computing device 2 of FIG. 2, may be retrieved and used to establish a secondary communication session (112). If no previous pairing information is available, pairing information may be exchanged between the devices in order to establish a pairing.

If the devices do not recognize each other (for example, the devices have not been previously paired), an encrypted channel may be established between with first and second devices over NFC (106). Session information for a secondary communication protocol may be exchanged over an encrypted NFC network (108). Encryption algorithms such as Pretty Good Privacy (PGP), Rivest, Shamir and Adleman (RSA), and general public-private key encryption, among other encryption algorithms, may be used.

At least one of the devices activates a secondary communication functionality, such as secondary communication device 4 of FIG. 1 (110). Using the session information, a secondary communication session may be established using the high power session information (112).

Once the secondary communication session is established, the first device and second device may communicate using the secondary communication session (114). That is, the first device and second device may initially communicate over short-range wireless network communications 24 in order to establish a communication session over secondary network communications 28.

In some examples, settings of devices or applications executing on one or both of the computing devices may be automatically modified based on the particular tag detected by the devices. In other examples, power states of one or more devices of the device may be modified based on the information detected by the devices.

Figure 5:
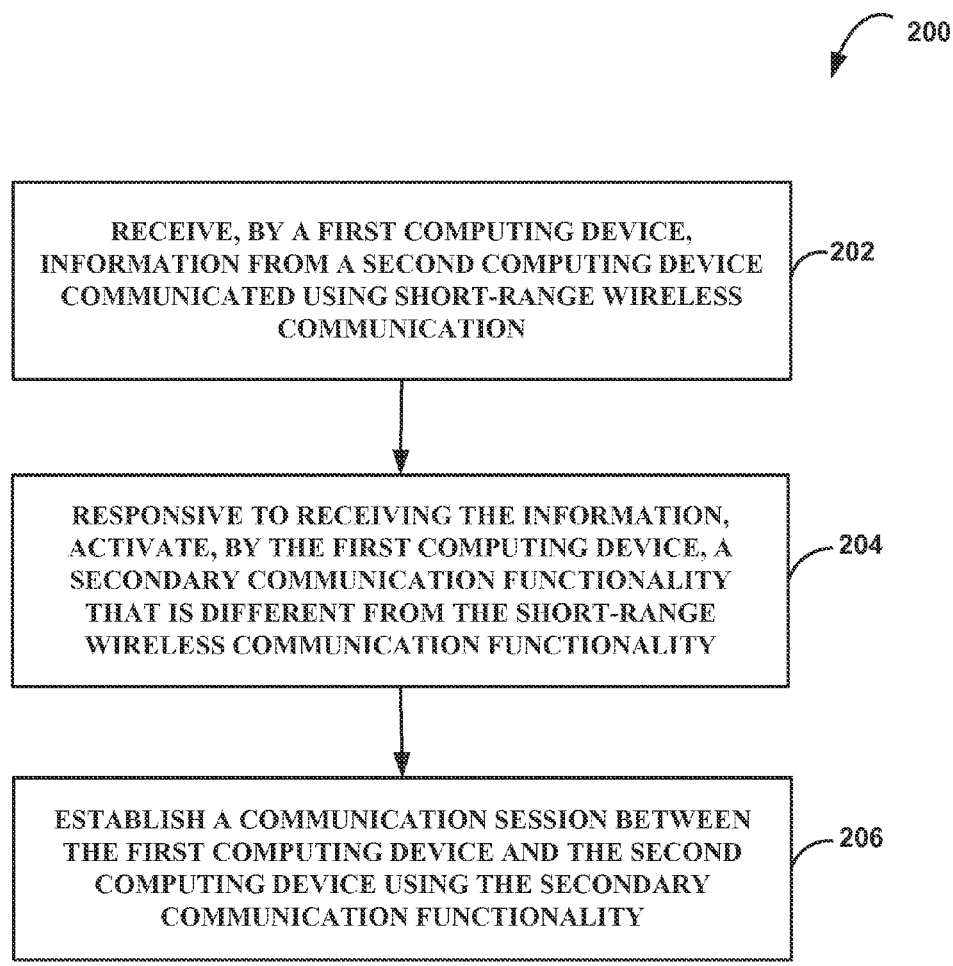
FIG. 5 is a flow chart illustrating an example method that may be performed by a computing device to establish a communication session with another device, in accordance with one or more aspects of the present disclosure.

FIG. 5 is a flow chart illustrating an example method 200 that may be performed by a computing device to establish a communication session with a device, in accordance with one or more aspects of the present disclosure. FIG. 5 illustrates only one particular example of method 200, which may be performed using computing device 2 of FIGS. 1 and 2, computing device 12 of FIG. 1, mobile device 60 of FIG. 3 or support device 70 of FIG. 3. In other examples, other computing devices may be used.

Method 200 may include receiving, by a first computing device, information from a second computing device communicated using short-range wireless communication functionality (202). The information may be a request to establish a communication session. The information may be received via a short-range wireless protocol. For example, this information may be identification information from a short-range wireless device, such as an NFC tag. The information may be exchanged when the first computing device and the second computing device come into range of their short-range wireless communication devices. The first computing device may send a response message that identifies the first computing device using short-range wireless communication functionality.

An encrypted channel may be established for communicating between the first computing device and the second computing device using the short-range wireless communication functionality. The first computing device may receive session information for a high-powered communication session from the second computing device over the encrypted channel. In one example, the information received by the first computing device may include a unique identifier of the second computing device.

Responsive to receiving the information, the first computing device may activate a secondary communication functionality that is different from the short-range wireless communication functionality (204). For example, the secondary communication may be a Bluetooth device, such as Bluetooth device 64 of FIG. 3. Activating the secondary communication device may include powering on the secondary communication device upon receiving the information.

Method 200 further includes establishing a communication session between the first computing device and the second computing device using the secondary communication functionality (206). Information exchanged in the communication session may be according to a secondary communication protocol.

In some examples, method 200 further includes determining whether the first computing device and the second computing device have been previously paired using a previous pairing. If so, a communication session is established using the previous pairing when the first computing device and the second computing device have been previously paired. In contrast, a pairing is initialized between the first computing device and the second computing device when the first computing device and the second computing device have not been previously paired.

The information received from the second computing devices may include configuration information. The first computing device may be connected to a secondary communication network with the secondary communications functionality using the configuration information obtained from the second computing device.

In another example, an accelerometer of the first computing device may detect a first acceleration within a selected period of time. Using the short-range wireless communication device, or another network device, the first computing device determines whether the second computing device also detected a second acceleration within the selected period of time. If both devices have detected a similar acceleration within the same period of time, the first computing device and the second computing device may be paired. The accelerometers may be used to determine that a tapping of the devices has occurred. For example, a magnitude of the first acceleration may be compared with a magnitude of the second acceleration. When the magnitude of the first acceleration is within a selected threshold level of the second acceleration, the first computing device and the second computing device may pair.

In another example, the first and second computing devices look for a sudden change in 3 dimensional position over time for each device and determine if they occur within a relatively close window of time. For example, velocities of the first computing device may be detected over the selected period of time. Similarly, velocities of the second computing device may be determined over the selected period of time. An accelerometer may be used to determine change in position over time for a device. In other example, additional sensors may be used, such as a gyroscope. When the velocities are within a selected threshold level of each other, the first computing device and the second computing device may pair. In other examples, other methods of determining if the first and second computing devices have bumped may be based on (x,y,z,t) curves of the two devices.

In another example, method 200 includes determining whether the second computing device can connect to the communication session. The secondary communication functionality may be activated by the first computing device based on whether the second computing device can connect to the communication session. In another example, method 200 includes entering a password or an encryption key to an application of the first computing device based on the information from the second computing device.

Method 200 may further include deactivating, by the first computing device, the secondary communication functionality once the communication session has ended. Also, the first computing device may deactivate a short-range wireless communication device in response to establishing the communication session.

In some examples, the secondary communication functionality may have a greater bandwidth and longer range than the short-range wireless communication functionality. For example, the secondary communication functionality may include functionality for one of Bluetooth, Wi-Fi, 2G, 3G, and Long Term Evolution (LTE). The short-range wireless communication functionality may be a near-field communication (NFC) protocol. In some examples, the communication session is of a personal area network (PAN).

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (for example, in RAM or cache).

Various aspects of the disclosure have been described. Aspects or features of examples described herein may be combined with any other aspect or feature described in another example. These and other embodiments are within the scope of the following claims.

What is claimed is:

1. A first computing device, comprising:
one or more processors;
a short-range wireless communication device configured to transmit and receive information via a short-range wireless communication protocol;
a secondary communication device configured to transmit and receive information via a secondary communication protocol, wherein the secondary communication protocol is different from the short-range wireless communication protocol;
an accelerometer; and
a memory storing instructions that when executed by the one or more processors cause the first computing device to perform a method for communicating with a second computing device, the method comprising:
receiving, using the short-range wireless communication device, a request to establish a communication session with the second computing device, wherein the request is transmitted using the short-range wireless communication protocol;
in response to the receiving, activating the secondary communication device;
detecting, using the accelerometer, an acceleration of the first computing device within a selected period of time
determining, by the first computing device and using the short-range wireless communication device, whether a second computing device detected an acceleration of the second computing device within the selected period of time; and
establishing a communication session with the second computing device using the secondary communication device when the second computing device detected the acceleration of the second computing device within the selected period of time, wherein the communication session utilizes the secondary communication protocol.

2. The first computing device of claim 1, wherein the communication session connects the first computing device directly to the second computing device.

3. The first computing device of claim 1, wherein the secondary communication device has a greater range than the short-range wireless communication device.

4. The first computing device of claim 1, wherein establishing the communication session further comprises:
   determining whether the first computing device and the second computing device have been previously paired using a previous pairing;
   establishing a pairing between the first computing device and the second computing device when the first computing device and the second computing device have not been previously paired; and
   establishing the communication session using the previous pairing when the first computing device and the second computing device have been previously paired.

5. A method comprising:
   receiving, by a first computing device, information from a second computing device communicated using short-range wireless communication functionality;
   responsive to receiving the information, activating, by the first computing device, a secondary communication functionality that is different from the short-range wireless communication functionality;
   detecting, using an accelerometer of the first computing device, an acceleration of the first computing device within a selected period of time;
   determining, by the first computing device, using the short-range wireless communication functionality, whether the second computing device detected an acceleration of the second computing device within the selected period of time; and
   establishing a communication session between the first computing device and the second computing device using the secondary communication functionality when the second computing device detected the acceleration of the second computing device within the selected period of time.

6. The method of claim 5, further comprising:
   determining whether the first computing device and the second computing device have been previously paired using a previous pairing, and
   wherein establishing the communication session further comprises:
      establishing a pairing between the first computing device and the second computing device when the first computing device and the second computing device have not been previously paired; and
      establishing the communication session using the previous pairing when the first computing device and the second computing device have been previously paired.

7. The method of claim 5, further comprising:
   establishing an encrypted channel for communicating between the first computing device and the second computing device using the short-range wireless communication functionality.

8. The method of claim 7, further comprising:
   receiving session information for the communication session from the second computing device over the encrypted channel.

9. The method of claim 5, wherein the information received from the second computing devices includes configuration information, and wherein the method further comprises:
   configuring the first computing device to connect to a secondary communication network with the secondary communication functionality using the configuration information obtained from the second computing device.

10. The method of claim 5, further comprising:
   determining one or more velocities of the first computing device over the selected period of time;
   determining one or more velocities of the second computing device over the selected period of time; and
   wherein pairing the first computing device and the second computing device further comprises pairing the first computing device and the second computing device when the one or more velocities of the first computing device is within a threshold level of the one or more velocities of the second computing device.

11. The method of claim 5, further comprising:
   sending, by the short-range wireless communication functionality of the first computing device, a response message identifying the first computing device.

12. The method of claim 5, further comprising:
   determining whether the second computing device can connect to the communication session, and
   wherein activating, by the first computing device, the secondary communication functionality is based on whether the second computing device can connect to the communication session.

13. The method of claim 5, further comprising:
   providing a password to an application of the first computing device based on the information from the second computing device.

14. The method of claim 5, wherein the information includes a unique identifier of the second computing device.

15. The method of claim 5, wherein activating the secondary communication device further comprises powering on the secondary communication device upon receiving the information.

16. The method of claim 5, further comprising:
   deactivating, by the first computing device, the secondary communication functionality once the communication session has ended.

17. The method of claim 5, further comprising:
   deactivating, by the first computing device, the short-range wireless communication device in response to establishing the communication session.

18. The method of claim 5, wherein the secondary communication functionality has a greater bandwidth and longer range than the short-range wireless communication functionality.

19. The method of claim 5, wherein the short-range wireless communication functionality uses a near-field communication (NFC) protocol, and
   wherein the secondary communication functionality includes functionality for one of Bluetooth, Wi-Fi, 2G, 3G, and Long Term Evolution (LTE).

20. The method of claim 5, wherein establishing the communication session connects the first computing device and the second computing device directly without any intermediary device between the first computing device and the second computing device.

21. A computer-readable storage medium comprising instructions for causing a first computing device having at least one processor and an accelerometer to perform operations comprising:

receiving, by the first computing device, information from a second computing device communicated using short-range wireless communication functionality;

responsive to receiving the information, activating, by the first computing device, a secondary communication functionality that is different from the short-range wireless communication functionality;

detecting, using the accelerometer, an acceleration of the first computing device within a selected period of time determining, by the first computing device, using the short-range wireless communication functionality, whether the second computing device detected an acceleration of the second computing device within the selected period of time; and establishing a communication session between the first computing device and the second computing device using the secondary communication functionality when the second computing device detected the acceleration of the second computing device within the selected period of time.

* * * * *